Jan. 6, 1953      F. D. ARNESON      2,624,379
SAW BAR ADJUSTMENT DEVICE
Filed Aug. 13, 1951
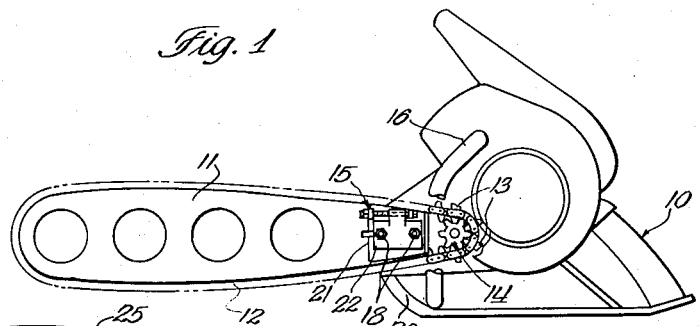
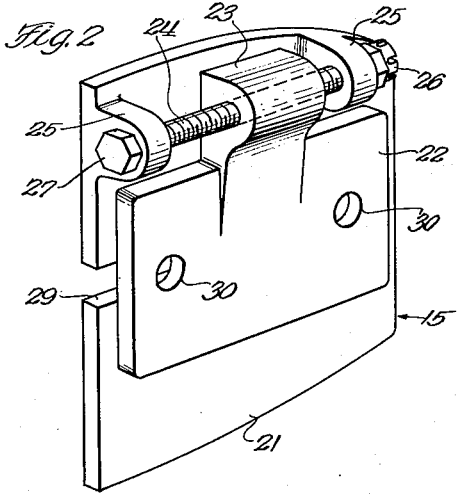
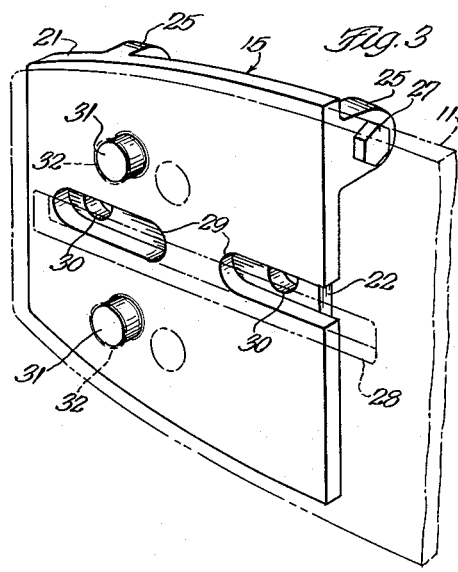
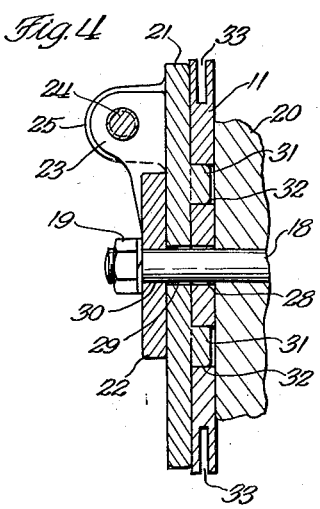
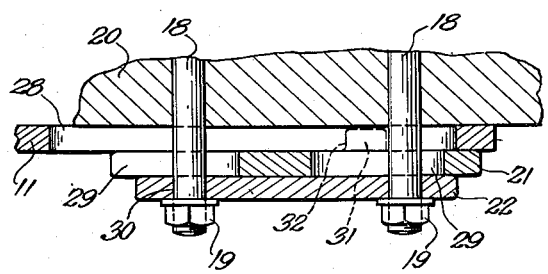
INVENTOR.
FLOYD D. ARNESON
BY Buckhorn and Cheatham
ATTORNEY Patented Jan. 6, 1953

2,624,379

UNITED STATES PATENT OFFICE 2,624,379

SAW BAR ADJUSTMENT DEVICE

Floyd D. Arneson, Klamath, Calif.

Application August 13, 1951, Serial No. 241,575

3 Claims. (Cl. 143—32)

The present invention relates to chain saws and more particularly to an adjustment device for use with chain saws.

Portable chain saws used extensively in modern lumbering operations consist essentially of a lightweight gasoline motor mounted within the frame driving an articulated endless chain carrying cutting teeth, said chain being supported by an elongated planar member, or saw bar, which itself is supported on the frame of the motor unit. Operation of the saw over a period of time causes wear of the various chain parts and consequent lengthening thereof. To maintain the proper tension in the saw chain, both to promote efficient operation thereof and also to promote the safe operation, it is necessary to frequently adjust the position of the saw bar in relation to the motor unit to take up the slack developed in the saw chain.

It is an object of the present invention to provide a device for adjusting the position of a saw bar in relation to the frame of a chain saw. It is a further object to provide a small compact attachment adaptable for quick and efficient adjustment of saw chains. Other objects and advantages of the invention will be apparent during the course of the following description.

In the accompanying drawings illustrating the present invention:

Fig. 1 is a side elevation of a chain saw showing the employment of the present invention;

Fig. 2 is a side view in perspective of the adjustment device of the present invention;

Fig. 3 is an opposite side view in perspective of the adjustment device with a broken portion of the saw bar in phantom;

Fig. 4 is a vertical sectional view of the adjustment device of the present invention mounted on a chain saw; and Fig. 5 is a horizontal sectional view of the adjustment device as mounted on a chain saw.

Turning now to Fig. 1, numeral 10 indicates the power plant and frame assembly of the chain saw, the power plant in most cases being a small internal combustion engine. Mounted on the frame unit 10 is saw bar 11 carrying thereon the articulated saw chain 12 bearing cutting teeth 13. The saw chain 12 is retained on the saw bar by means cooperative with groove 33 in said saw bar, said groove being illustrated in Fig. 4. The chain is driven by means of sprocket 14 connected through suitable driving mechanism to the power plant. The saw bar adjustment device 15 which is the object of the present invention is shown in Fig. 1 in relation to the saw bar and the motor frame unit on which it is mounted.

Turning now to the more detailed drawings of the invention, the saw chain adjustment device 15 consists of a base plate member 21 and a second plate member 22. Base plate 21 is adapted to be mounted with one surface thereof adjacent the surface of the saw bar outermost from the motor frame. Means are provided for securing the base plate 21 to the saw bar 11, which means in this instance comprise a pair of short studs 31 depending from the surface of the plate 21 adjacent the saw bar 11 which studs are cooperatively received in the recesses 32 provided in saw bar 11. When so engaged, it may be seen that plate 21 cannot be moved in a direction in the plane of the adjacent surfaces. Integral with the second plate 22 is an internally threaded block 23 which carries therethrough a cooperatively threaded screw 24. Screw 24 is journaled in bracket members 25 mounted on the base plate 21 and is restrained from axial movement through the bracket members by the screw head 27 and the screw nut 26. Bracket members 25 are journaled sufficiently large to allow rotational movement of screw 24 therein. The second plate 22 carries a pair of openings 30 aligned with elongated slots 29 of base plate 21. Screw member 24 is mounted with the longitudinal axis thereof parallel to said slots 29 so that rotational movement thereof will cause openings 30 to move along slots 29. As seen in Fig. 3, base plate 21 is mounted on saw bar 11 which has a slot 28 therein with which the slots 29 of base plate 21 are aligned.

Projecting from the motor unit 10 are a pair of stud bolts 18 to which saw bar 11 is normally secured. The adjustment device of the present invention is adapted to utilize these same studs as will be seen from the following description. The openings 30 in the second plate 22 are adapted to cooperatively and snugly receive stud bolts 18. When assembled with the saw bar as shown in Fig. 4, from right to left, the assembly includes motor frame member 20, saw bar 11, base plate 21 and the second plate 22. Since the second plate 22 is restrained from movement by stud bolts 18, rotational movement of screw 24 causes relative movement of base plate 21 in respect to upper plate 22 and plate 21 will carry with it saw bar 11 because of its engagement therewith, and consequently saw bar 11 will move in respect to the motor unit 10. By proper adjustment of screw 24, the desired movement of saw bar 11 in a direction longitudinally thereof may be attained.

In practice, when it is desired to adjust saw bar 11, nuts 19 on bolts 18 are loosened and screw 24 is turned by means of head 27 in the direction to obtain the desired movement of base plate 21 and saw bar 11. As saw bar 11 moves outwardly from the motor housing 10, the slack in saw chain 12 is take up. When the desired tension is attained, nuts 19 are once again tightened and saw bar 11 is held securely from movement in respect to the motor unit.

Previous to the invention of this adjustment device, it was the practice in the industry to manually adjust the saw bar by simply loosening the stud bolts 18, pulling saw bar 11 out by hand, and tightening down on the stud bolts when the desired tension was attained. Such an operation, however, required two men, since one man could not pull the saw bar to the desired tension and tighten the bolts at the same time. By means of the present invention, one man can quickly and efficiently tighten the saw chain and can attain the desired tension a great deal more accurately than was possible by the former procedure.

The particular device pictured was constructed for one particular chain saw at present commercially manufactured in large numbers. It should be understood, therefore, that the invention necessarily may be modified in various aspects to adapt it to other makes of saws which have slightly different structural features but which have the same essential items of the saw pictured, namely, a motor, a frame member supporting the housing, a saw bar secured to the frame by means of stud bolts or their equivalent, and a saw chain. Obviously the base plate 21 may be engaged to saw bar 11 by other means than the short stud arrangement illustrated. Also, the screw-thread adjustment means may take other forms than that particular embodiment shown. It is to be understood, therefore, that the form of the present invention herewith shown and described is to be taken only as a preferred example of the same and that various changes in the shape, size and arrangement of parts may be resorted to without departing from the spirit of the invention.

I claim:

1. An adjustment device for use in effecting relative adjustment between a saw bar and the frame of the motor unit of a chain saw apparatus, the motor frame including a plurality of stud bolts projecting outwardly therefrom, one end of the saw bar being provided with an elongated slot extending in the direction longitudinally of the bar for cooperatively receiving said stud bolts, said saw bar being adapted to be secured in place by said stud bolts in any one of a plurality of positions in the direction longitudinally of the saw bar within the limits of said elongated slot, said device comprising a base plate having a pair of parallel plane surfaces, said base plate being adapted to be mounted with one surface thereof abutting one side surface of the saw bar, said base plate being provided with elongated slots adapted to be aligned with said saw bar slot and adapted to receive cooperatively therethrough said stud bolts, short studs projecting outwardly from said one side surface of said base plate, said one side surface of said saw bar having recesses adapted for cooperative engagement by said short studs, said device including a second plate mounted upon the other surface of said base plate, said second plate including spaced-apart openings for cooperatively and relatively snugly receiving said stud bolts, an elongated screw-threaded adjustment means rotatably mounted upon said other surface of said base plate in a direction with its axis parallel with said elongated slots in said base plate, means restraining said screw means against movement in the direction longitudinally thereof, said second plate including a portion cooperatively threaded and mounted upon said screw means whereby upon rotation of said screw-thread adjustment means adjustment of said base plate relative to said second plate and frame may be effected in the direction longitudinally of said slots of said base plate.

2. An adjustment device for use in effecting relative adjustment between a saw bar and the frame of the motor unit of a chain saw apparatus, the motor frame including stud bolts projecting outwardly therefrom, one end of the saw bar being provided with an elongated slot extending in the direction longitudinally of the bar for cooperatively receiving said stub bolts, said saw bar being adapted to be secured in place by said stud bolts in any one of a plurality of positions in the direction longitudinally of the saw bar within the limits of said elongated slots, said device comprising a base plate having a pair of parallel plane surfaces, said base plate being adapted to be mounted with one surface thereof abutting one side surface of the saw bar, said base plate being provided with elongated slots adapted to be aligned with said saw bar slot and adapted cooperatively to receive therethrough said stud bolts, means for securing said base plate to said saw bar, said device including a second plate mounted upon the other surfaces of said base plate, said second plate including spaced-apart openings for cooperatively and relatively snugly receiving said stud bolts, an elongated screw-threaded adjustment means rotatably mounted upon said other surface of said base plate in a direction with its axis parallel with said elongated slots in said base plate, means restraining said screw means against movement in the direction longitudinally thereof, said second plate including a portion cooperatively threaded and mounted upon said screw means whereby upon rotation of said screw-thread adjustment means adjustment of said base plate relative to said second plate and frame may be effected in the direction longitudinally of said slots of said base plate.

3. An adjustment device for use in effecting relative adjustment between a saw bar and the frame of the motor unit of a chain saw apparatus, the motor frame including means projecting outwardly therefrom for affixing said saw bar thereto, one end of the saw bar being provided with an elongated opening for cooperatively receiving said affixing means, said bar being adapted to be secured in place by said affixing means in any one of a plurality of positions within the limits of said opening, said device comprising a base plate having a pair of parallel plane surfaces, said base plate being adapted to be mounted with one surface thereof abutting one side surface of the saw bar, said base plate being provided with elongated openings adapted to be aligned with said saw bar opening and adapted cooperatively to receive therethrough said affixing means, means for securing said base plate to said saw bar, said device including a second plate mounted upon the other surface of said base plate, said second plate including openings for cooperatively and relatively snugly receiving said affixing means, and screw means cooperatively connecting said base plate and said second plate whereby upon rotation of said screw means adjustment of said base plate relative to said second plate and frame may be effected in the direction longitudinally of said openings in said base plate.

FLOYD D. ARNESON.

REFERENCES CITED

The following references are of record in the file of this patent:

UNITED STATES PATENTS

| Number | Name | Date |
|---|---|---|
| 2,051,195 | Arsneau | Aug. 18, 1936 |
| 2,348,588 | Arsneau | May 9, 1944 |